US012692451B2

(12) United States Patent
Hazazi

(10) Patent No.: US 12,692,451 B2
(45) Date of Patent: Jul. 28, 2026

(54) DOWNHOLE MEMBRANE SYSTEM TO CONTROL NATURAL GAS PRODUCTION

(71) Applicant: SAUDI ARABIAN OIL COMPANY, Dhahran (SA)

(72) Inventor: Khalid Yahya Hazazi, Thuwal (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 230 days.

(21) Appl. No.: 18/410,659

(22) Filed: Jan. 11, 2024

(65) Prior Publication Data

US 2025/0230372 A1 Jul. 17, 2025

(51) Int. Cl.
*C10L 3/10* (2006.01)
*B01D 46/54* (2006.01)

(52) U.S. Cl.
CPC .............. *C10L 3/10* (2013.01); *B01D 46/543* (2013.01)

(58) Field of Classification Search
CPC ................................ C10L 3/10; B01D 46/543
See application file for complete search history.

(56) References Cited

U.S. PATENT DOCUMENTS

| | | | |
|---|---|---|---|
| 4,857,078 A | 8/1989 | Watler | |
| 6,454,836 B1 | 9/2002 | Koelmel et al. | |
| 6,755,251 B2 | 6/2004 | Thomas et al. | |
| 9,255,731 B2 * | 2/2016 | Prim ...................... F25J 3/0242 | |
| 2003/0047310 A1 * | 3/2003 | Thomas .............. E21B 41/0064 166/265 | |

| | | | |
|---|---|---|---|
| 2013/0098608 A1 * | 4/2013 | Barnum ................... E21B 43/13 166/263 | |
| 2016/0369611 A1 * | 12/2016 | Bragg ................. E21B 43/2605 | |
| 2020/0376438 A1 * | 12/2020 | Kodama ............. B01D 53/226 | |
| 2023/0135721 A1 * | 5/2023 | Ding ........................ F25J 3/061 95/50 | |

FOREIGN PATENT DOCUMENTS

WO          0227141 A1     4/2002

OTHER PUBLICATIONS

Byunghyun Min, et al. "Separation of C2—C4 Hydrocarbons from Methane by Zeolite MFI Hollow Fiber Membranes Fabricated from 2D Nanosheets" AIChE Journal 2020 (34 pages).

(Continued)

*Primary Examiner* — James C Goloboy
(74) *Attorney, Agent, or Firm* — Osha Bergman Watanabe & Burton LLP

(57) ABSTRACT

A method for controlling production of natural gas includes a membrane module comprising a membrane that permeates NGL over methane, separating natural gas into an NGL rich permeate and a methane rich retentate, carrying the permeate from the membrane module to a gas plant, carrying the retentate from the membrane module for injection into a storage zone where the retentate is stored when demand is low; and recovered when demand is high. A system includes a membrane module for receiving a feed comprising natural gas, separating the natural gas into a permeate rich NGL and a retentate rich methane, a gas plant, a line for carrying the permeate from the membrane module to the gas plant, a storage zone; another line for carrying the retentate from the membrane module to the storage zone; and a production line for recovering methane rich gas from the storage zone to the gas plant.

11 Claims, 3 Drawing Sheets

(56)             References Cited

OTHER PUBLICATIONS

Roy D. Raharjo et al. "Pure and mixed gas CH4 and n-C4H10 permeability and diffusivity in poly(dimethylsiloxane)" Journal of Membrane Science 306 (2007) 75-92 (18 pages).

E.A. Grushevenko et al. "Polyalkylmethylsiloxanes composite membranes for hydrocarbon/methane separation: Eight component mixed-gas permeation properties" Elsevier B.V. 2020 (24 pages).

M. Arruebo et al. "Separation of hydrocarbons from natural gas using silicalite membranes" Elsevier science B.V. 2001 (12 pages).

John Yang et al. "Modified rubbery siloxane membranes for enhanced C3+ hydrocarbon recovery from natural gas: Pure and multicomponent gas permeation evaluation" Separation and Purification Technology 2020 (9 pages).

J. Schultz "Membranes for separation of higher hydrocarbons from methane" Journal of Membrane Science 110 (1996) 37-45 (9 pages).

* cited by examiner

300

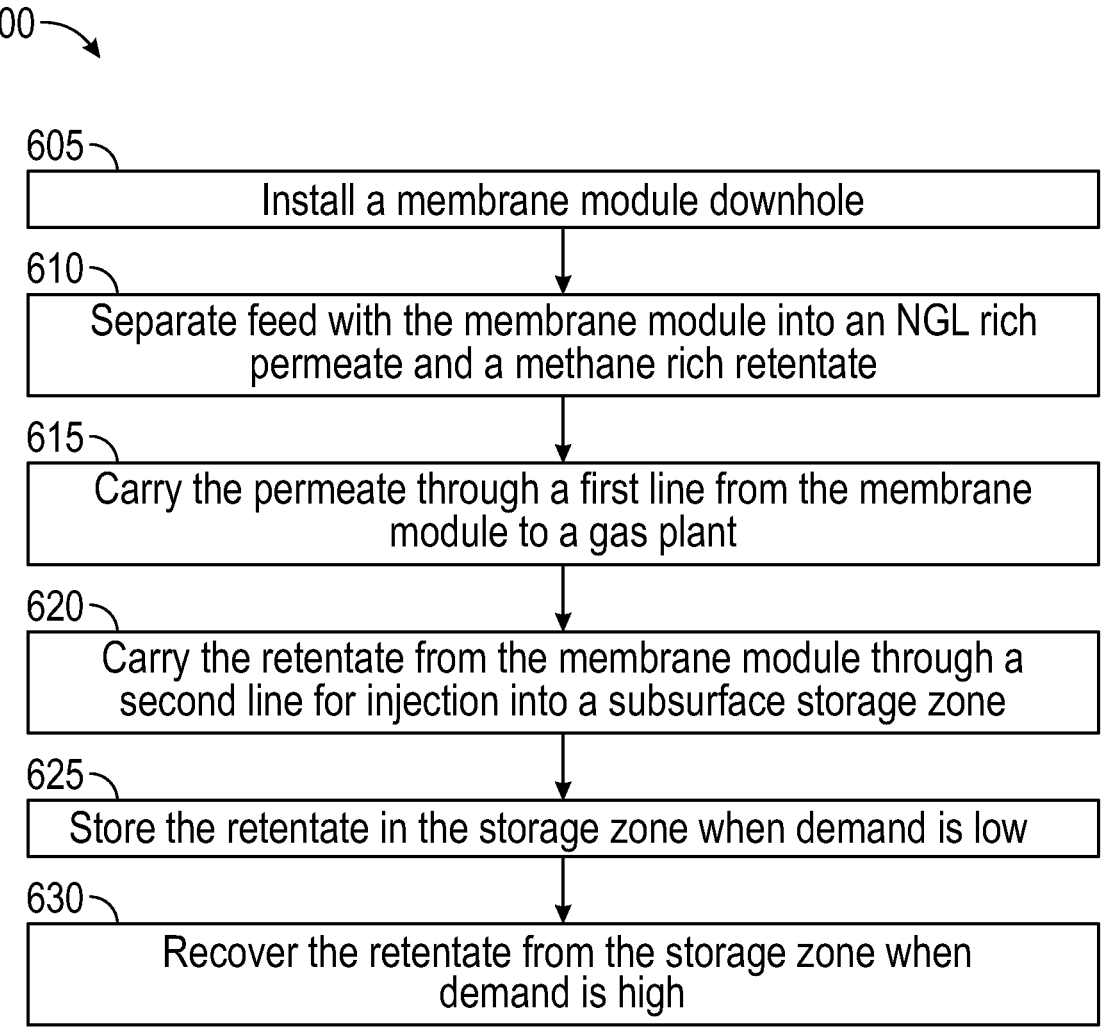

605
Install a membrane module downhole

610
Separate feed with the membrane module into an NGL rich permeate and a methane rich retentate 615
Carry the permeate through a first line from the membrane module to a gas plant 620
Carry the retentate from the membrane module through a second line for injection into a subsurface storage zone 625
Store the retentate in the storage zone when demand is low 630
Recover the retentate from the storage zone when demand is high

FIG. 3

DOWNHOLE MEMBRANE SYSTEM TO CONTROL NATURAL GAS PRODUCTION

BACKGROUND

Natural gas is a gaseous mixture of hydrocarbons predominantly composed of methane. Natural gas is also the most significant source of natural gas liquids (NGL) contributing over 90% of NGL production. The components of natural gas may be useful for generating electricity, synthesizing organic compounds, and for manufacturing plastics. Specifically, NGLs such as propane and butane have a wide variety of applications such as fuels. Also, ethane may be used in petrochemical feedstocks. However, the demand for natural gas components, such as methane, fluctuates seasonally around the globe. For example, in cooler countries an increase of space heating for residential and commercial use typically increases the demand of natural gas during the winter months. Similarly, in warmer countries natural gas demand typically increases in summer months to meet air-conditioning needs. Thus, during time periods of lower demand, the excess natural gas is stored after NGLs are extracted. Typically, the natural gas is stored on the surface. Storing natural gas is costly and may not be economically feasible. Accordingly, there exists a need for economically feasible alternatives to storing excess natural gas on the surface.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to, among other things, a method for controlling production of natural gas from a formation below a surface. The method includes installing a membrane module comprising a membrane downhole where the membrane selectively permeates NGL over methane, separating high pressure natural gas feed with the membrane module into an NGL rich permeate and a methane rich retentate, carrying the permeate through a first line from the membrane module to a gas plant located above the surface, carrying the retentate from the membrane module through a second line for injection into a storage zone below the surface; storing the retentate in the storage zone when demand is low, and recovering the retentate from the storage zone through a third line when the demand is high.

In another aspect, embodiments disclosed herein relating to, among other things, a system for controlling production of natural gas. The system includes a membrane module installed downhole within a casing of a wellbore in a production reservoir. The membrane module is configured for receiving a feed comprising a high-pressure natural gas from the production reservoir, and separating the high pressure natural gas into a permeate rich in NGL and a retentate rich in methane. The system further includes a gas plant located at a surface, a first line within the casing for carrying the permeate from the membrane module to the gas plant, a storage zone located below the surface, a second line within the casing for carrying the retentate from the membrane module to the storage zone, and a production line within the casing for recovering methane rich gas from the storage zone to the gas plant.

Other aspects and advantages of the claimed subject matter will be apparent from the following description and the appended claims.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the spirit and scope of the disclosed subject matter as defined by the appended claims.

Typically, down is toward or at the bottom and up is toward or at the top of the figure. "Up" and "down" are oriented relative to a local vertical direction. However, in the oil and gas industry, one or more activities may take place in deviated or horizontal wells. Therefore, one or more figures may represent an activity in vertical, approximately vertical, deviated, approximately horizontal, or horizontal wellbore configuration.

BRIEF DESCRIPTION OF DRAWINGS

FIG. 3 is a illustrates a method for controlling the production of natural gas.

DETAILED DESCRIPTION

Natural gas and Natural gas liquids (NGL) products are extracted as a valuable byproduct of oil and gas production. Natural gas is mainly composed of methane and over 90% of NGL products are associated with natural gas. The market demand for natural gas is increasing globally, however; the market demand fluctuates substantially in many regions of the world. However, the demand of NGL does not experience similar fluctuations. These fluctuations in natural gas demand is typically caused by, among other things, seasonal demand for energy for heating or cooling residential and commercial buildings.

This creates an abundance of unneeded natural gas during times of low demand. Accordingly, the excess natural gas composed primarily of methane must be stored in periods of low demand. Typically, excess, or unneeded natural gas is stored at the surface after the NGL are removed. The storage of natural gas at the surface requires surface additional space, equipment, and facilities. This infrastructure is expensive and may be economically unfeasible under some conditions. Further, in periods of low demand, much of this infrastructure is not being used. Accordingly, a system and process for storing natural gas in the subsurface in periods of low demand will be useful.

System and process embodiments disclosed herein provide an economically feasible alternatives to storing natural gas at the surface. Specifically, natural gas is injected and stored in a subsurface storage zone until it is needed. Further, the system and process embodiments herein allow NGL production to be maintained. This result is achieved by using a downhole membrane system configured to store natural gas in formations when market demand for natural gas is low. The downhole membrane selectively produces NGL while the methane containing natural gas is transported to an underground formation.

According to one or more embodiments, a module containing a membrane is installed downhole in the subsurface. The membrane may be a chemical separation device configured to separate a feed into an NGL rich permeate and a methane rich retentate. After separation, a line is used to carry the NGL containing permeate from the membrane module to a gas plant located at the surface. The NGL may be continuously carried by the line to the gas plant where it is processed and sold to meet the continuous market demand.

Another line is used to carry the methane containing retentate from the membrane module to a subsurface storage zone configured to store the retentate. During periods of low demand, the retentate may be stored in the storage zone. During periods of high demand, a line may be used to recover the retentate from the storage zone and carry it from the storage zone to the gas plant located at the surface. The methane in the retentate may be processed in the gas plant and sold to meet the high market demand.

Figure 1A:
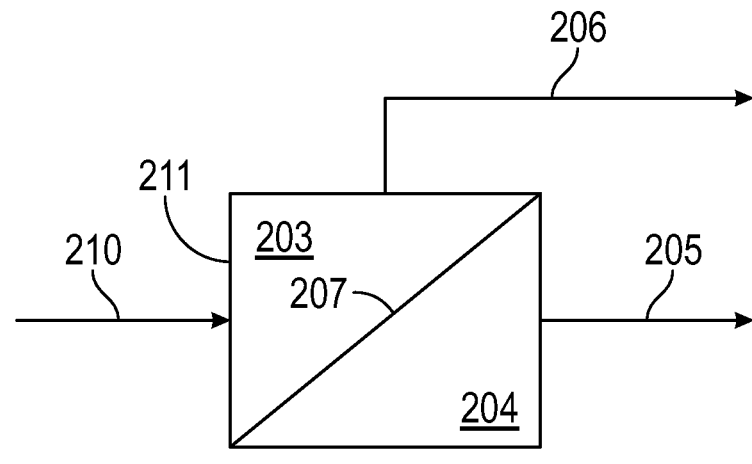
FIG. 1A is a diagram that illustrates a membrane module according to one or more embodiments.
Figure 1B:
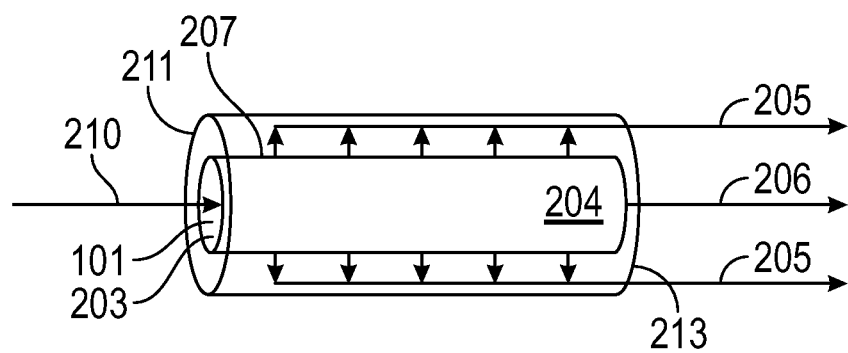
FIG. 1B is a diagram that illustrates a membrane module according to one or more embodiments.

FIGS. 1A and 1B illustrate a membrane module according to one or more embodiments. Generally, in FIG. 1A, a membrane 207 is a chemical separation device housed in a pressure vessel often referred to as a membrane module 211. According to one or more embodiments, the membrane module 211 may be fabricated from stainless steel. Those having skill in the art would appreciate that the membrane module may be fabricated from other materials as well.

The membrane 207 may be composed of a semi-permeable material that allows some chemicals to permeate, or pass through, the membrane faster than others. A membrane may be used for natural gas separation. According to one or more embodiments, the membrane 207 is a selective barrier composed of a material designed to provide high permeation rates for components of NGL (e.g., ethane, propane, butane, isobutane, C5+ hydrocarbons and impurities). The membrane 207 is a barrier that provides low permeation rates for methane, thus methane is retained and recovered in a retentate 206 stream.

A variety of membrane materials may be useful for the separation of methane from hydrocarbon carbons. (e.g., NGLs). The membrane 207 may be fabricated from material including, but not limited to, Poly (dimethylsiloxane) (PDMS), Poly (1-trimethylsilyl-1-propyne) (PTMSP) or poly (octyl-methyl-siloxane) (POMS).

FIG. 1B illustrates a membrane module 211 according to one or more embodiments. A membrane 207 may be configured as elements constructed in the form of hollow fibers or spiral-wound sheets around a central core. According to one or more embodiments, the membrane does not extend to the inside wall of the membrane module such that there is a space between where the membrane and the wall of the membrane module where the feed is injected and where retentate collects.

The membrane module 211 illustrated in FIG. 1B is a cylindrical type of module. The height, width, length and radius contemplated for a particular cylindrical membrane module or for the cylindrical membrane may vary on several factors including, but not limited to, the location and the dimensions of the well casing in which the membrane module is installed.

The membrane module 211 allows the feed 210 (typically natural gas) to pass through the center 101 of the module from the feed side 203. A portion of the natural gas components passes through the membrane as permeate 205. The retentate 206 does not pass through the membrane 207 and flows through the center 101 of the membrane module to the delivery side 213.

Accordingly, a membrane module 211 is generally designed to house the membrane and configured to allow for fluid contact of a feed 210 with the surface of the membrane 207.

A membrane module 211 may also be configured as a pressure vessel and provide the necessary connections for the feed 210 to contact the feed side 203 of the membrane, while permeate 205 is removed from the permeate side 204 of the membrane 207. Pressure is maintained on the feed side 203 of the membrane, while the permeate side 204 is maintained at a lower pressure. According to one or more embodiments, the pressure may range from 10-300 bar.

The pressure differential between the feed side 203 and permeate side 204 provides the driving force for separation of a portion of the feed 210 to pass through the membrane 207. The portion of a feed 210 that passes through, or permeates through, a membrane is called the permeate 205. The remainder of the feed 210 leaving the membrane module 211, less the permeate 205, is called the retentate 206.

Figure 1C:
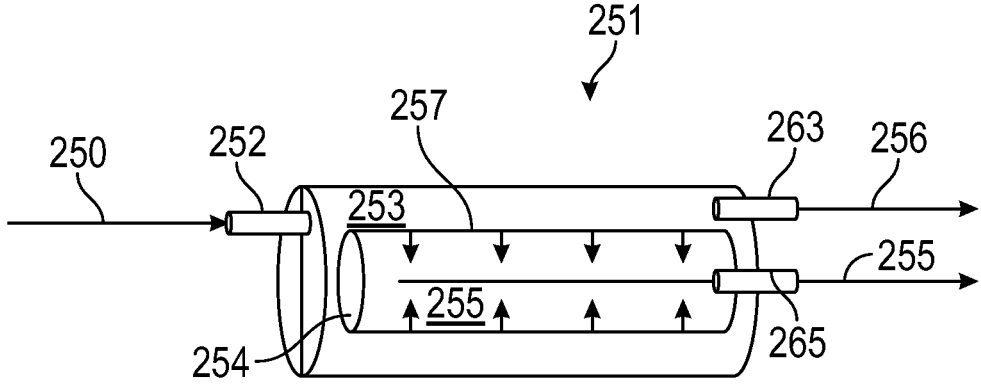
FIG. 1C is a diagram that illustrates a membrane module according to one or more embodiments.

FIG. 1C illustrates a membrane module 251 according to one or more embodiments. A membrane 257 may be configured as elements constructed in the form of hollow fibers or spiral-wound sheets around a central core. According to one or more embodiments, the membrane does not extend to the inside wall of the membrane module such that there is a space between where the membrane and the wall of the membrane module where the feed is injected and where retentate collects.

The membrane module 251 illustrated in FIG. 1C is a cylindrical type of module. The height, width, length and radius contemplated for a particular cylindrical membrane module or for the cylindrical membrane may vary on several factors including, but not limited to, the location and the dimensions of the well casing in which the membrane module is installed.

The membrane module 251 may be connected to a feed inlet 252 configured to pass feed 250 to the feed 253 of the membrane module. The feed side 253 of the membrane module may also be known as the feed domain. A portion of the natural gas components passes through the membrane 257 as permeate 255. The retentate 256 does not pass through the membrane 257 and flows out of the feed side of the membrane module. The membrane module 251 may be connected to a retentate outlet 263 configured to pass retentate 256 out of the membrane module 251.

Accordingly, a membrane module 251 is generally designed to house a membrane and is configured to allow for fluid contact of a feed 250 with the surface of the membrane 257. A membrane module 251 may also be configured as a pressure vessel and provide the necessary connections for the feed 250 to contact the feed side 253 of the membrane, while permeate 255 is removed from the permeate side 254 of the membrane 257. Pressure is maintained on the feed side 253 of the membrane, while the permeate side 254 is maintained at a lower pressure. According to one or more embodiments, the pressure may range from 10-300 barometers.

The pressure differential between the feed side 253 and permeate side 254 provides the driving force for separation of a portion of the feed 250 to pass through the membrane 207. The portion of a feed 250 that passes through, or permeates through, a membrane is called the permeate 255. The membrane module 251 may be connected to a permeate outlet 265 configured to pass permeate 255 out of the membrane module 251. The remainder of the feed 250 leaving the membrane module 251, less the permeate 255, is called the retentate 256.

Downhole Membrane Gas Separation System

The downhole membrane gas separation system may be applied to various types of well completions including vertical cased and cemented wells, and open-hole multi-stage fracturing wells. The method may be used in deep, shallow, single and multi-lateral wells.

Figure 2:
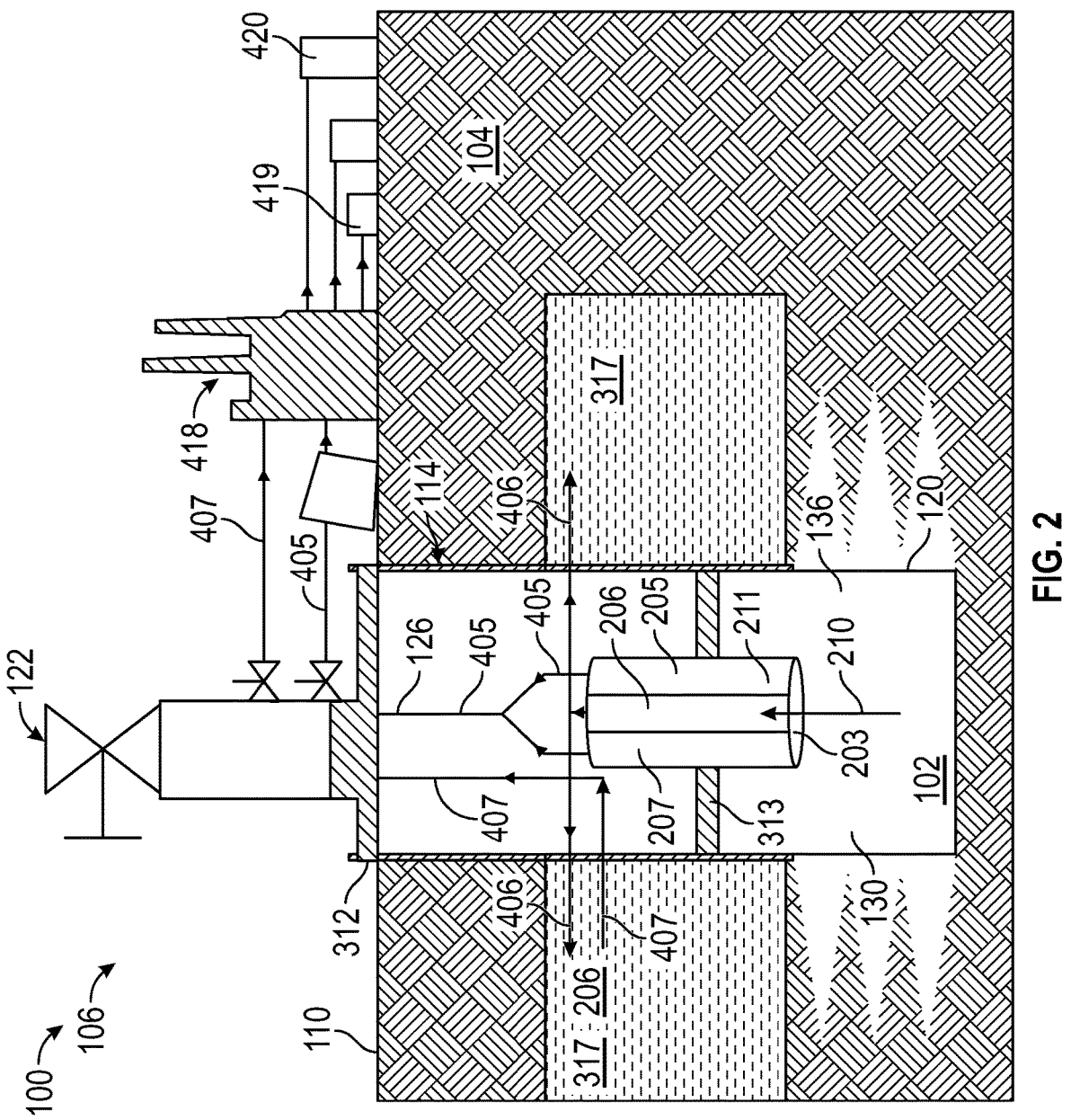
FIG. 2 is a schematic that illustrates a downhole membrane system for controlling natural gas production according to one or more embodiments.

FIG. 2 is a diagram illustrates a downhole membrane gas separation system according to one or more embodiments. In FIG. 2, the well environment 100 includes a production formation 102 located among the subsurface formations 104. A well system 106 is shown traversing the subsurface formations 104 and is in fluid communication with production formation 102 via a wellbore 114. A wellbore is a drilled hole typically configured to enhance the extraction of oil or natural gas.

Subsurface formations 104 may include one or more rock formations that reside beneath the surface 110. The well environment 100 includes a surface 110, which represents the surface of the earth. The surface 110 may be located on the ground, above water, under water, or under ice. The well system 106 may be formed for the purposes of developing a hydrocarbon well, such as an oil well, a gas well, a gas condensate well, or combinations thereof. The well system 106 may have been formed for the purposes of fluidly accessing the production formation 102. The subsurface formations 104 and the formation 102 may each have heterogeneity with varying characteristics, such as degree of density, permeability, porosity, pressure, temperature, and fluid saturations of the rock within each formation. The production formation 102 may contain hydrocarbons.

The wellbore 114 may include a bored hole that extends from the surface 110 into the subsurface formations 104 such that fluid communication is established with the production formation 102. The wellbore 114 is a void that is defined by wellbore wall 120. According to one or more embodiments, the wellbore 114 may include one or more horizontal portions.

According to one or more embodiments, the well system 106 includes a wellhead 122 that supports, couples to, and provides surface access to a production line 126. The production line 126 may be comprised of drill pipe, coiled tubing, fixed tubing, or other forms of fluid conduit for conveying fluids between the formation 102 and the surface 110. The wellbore annulus 130 is the void of the wellbore 114 between the production line 126 and the wellbore wall 120. The wellbore annulus 130 is filled with a completion fluid 136 to maintain structural integrity of the wellbore 114 and to protect the production lines and objects, thermally and chemically, in the wellbore 114.

According to one or more embodiments a production line 126 may be coupled to compressor 451. The compressor is configured to receive the contents of production line 126 a create compressed gas or liquid. The compressed gas created by the compressor has a pressure that is raised to a value greater than atmospheric pressure.

According to one or more embodiments, the production line 126 is coupled to a to a gas plant 418. In one or more embodiment, the gas plant may be a gas oil separation plant (GOSP), or other type of gas handling plant. The gas plant

418 is configured to receive natural gas products produced from the well environment such as methane and NGL from appropriate production lines. The gas plant may also be configured to remove contaminants from methane. The gas plant may also may be configured to remove contaminants from the NGL, such as carbon dioxide, hydrogen sulfide, and water. Aside from NGL, the membrane may be selective for contaminants that are removed in the gas plant 418. The gas plant may be configured to manufacture refined NGL 419 products.

A downhole membrane gas separation system includes a membrane module 211. According to one or more embodiments, a membrane module 211 is positioned in the wellbore 114. The membrane module 211 is configured to house a membrane 207 and to receive a feed 210 comprising high-pressure natural gas. The membrane is more selective for condensable components that constitute NGL (i.e., ethane, propane, butane and isobutane) over methane. Accordingly, the membrane 207 is configured to separate the feed 210 into a permeate 205 that is rich in NGL and a retentate 206 rich in methane.

According to one or more embodiments, the membrane module 211 is installed within the casing 312. Additionally, a seal 313 may be installed around the membrane module 211. The seal is configured to prevent the feed 210 from bypassing the membrane 207 of the membrane module 211. A seal 313, often called a packer, is commonly used for installation of production tubing in the casing 312. A seal 313 may similarly be used for installing a membrane module 211 inside of casing 312.

According to one or more embodiments, signal and power lines (not shown) are coupled to the membrane module 211 or to other downhole components for communicating data to the surface. The signal and power lines may communicate information including, but not limited to, pressure, temperature, and flow rates of the fluids.

According to one or more embodiments, the downhole membrane gas separation system includes production lines inside the casing 312. Production lines may be configured to carry permeate and retentate from the wellbore to the surface 110. A production line referred to as a first line 405 is configured to carry permeate 205 to the surface. A production line referred to as a second line 406 is configured to carries the retentate 206 from a membrane module 211 to a storage zone 317 within a suitable formation below the surface. According to one or more embodiments, the methane does not need to be processed at the gas plant prior to storage, thus the second line 406 may carry the methane from the membrane module 211 to a suitable formation directly (i.e. without introducing the methane to the surface. However, according to one or more embodiments, the retentate may be injected and carried by an additional injection line (not shown) from the surface to a suitable formation for storage. The retentate 206 may be kept in a storage zone 317 until the methane rich retentate 206 is desired to meet methane demand. A production line referred to as a third line 407 is configured to carry retentate 206 from a storage zone 317 to be refined in a gas plant 418 on the surface 110. The gas plant is configured to remove contaminants from the retentate to produce a natural gas product 420.

NGL is processed in a gas plant 418 where some constituents of the NGL such as methane or ethane may be removed. Further, contaminants such as $CO_2$ and $H_2S$ may also be removed. Methane withdrawn from the storage zone 317 is processed in the gas plant 417 to remove remaining C2+ hydrocarbons, and contaminants such as $CO_2$ and $H_2S$. Natural gas 420 produced from the gas plant should meet local product specifications.

The methane carried with NGL rich permeate 205 depends on the membrane module and operating conditions. For example, increasing the pressure difference between the feed side 203 and permeate side 204 results in an increase in methane permeating the membrane. NGL 219 leaving the gas plant should meet the product specifications for purity, composition, and vapor pressure.

FIG. 3 provides a schematic of workflow 300 illustrating general steps of one or more embodiments of the method for controlling production of natural gas. The steps may include: Install a membrane module downhole 605; Separating feed with the membrane module into an NGL rich permeate and a methane rich retentate 610; Carrying the permeate through a first line from the membrane module to a gas plant 615; Carry the retentate from the membrane module through a second line for injection into a subsurface storage zone 620; Storing the retentate in the storage zone when demand is low 625; and recovering the retentate from the storage zone when the demand is high 630.

In workflow 300 of FIG. 3, step 605 shows that a membrane module may be installed downhole. According to one or more embodiments, the membrane module may be installed in the subsurface in a wellbore. According to one or more embodiments, the membrane module is installed within a casing. A seal may also be installed around the membrane module to prevent the feed from bypassing the membrane of the membrane module. According to one or more embodiments, signal and power lines coupled to the membrane module or to other downhole components communicate data to the surface. The signal and power lines may communicate information including, but not limited to, pressure, temperature, and flow rates of the fluids.

The membrane module may include or comprise a membrane that selectively permeates NGL over methane rich retentate as shown in step 610 of workflow 300. A feed (typically natural gas) may contact the surface of the membrane in the membrane module. The membrane module allows feed to pass through the membrane module from a feed side. A portion of the natural gas components pass through the membrane as permeate. The retentate does not pass through the membrane and flows through the membrane module to a delivery side. According to one or more embodiments, pressure is maintained on the feed side of the membrane, while the permeate side is maintained at a lower pressure.

In step 615 of workflow 300, the permeate is carried through a first line from the membrane module to a gas plant. The, permeate that includes NGL may be continuously carried by the line to a gas plant. The gas plant may remove contaminants from the NGL, such as carbon dioxide, hydrogen sulfide, and water. Further, refined NGL products may be manufactured at in the gas plant.

In step 620 of workflow 300, the retentate is carried from the membrane module through a second line for injection and storage into a storage zone. According to one or more embodiments, the methane rich retentate is not processed at a gas plant prior to storage, thus the second line may carry the methane rich retentate from the membrane module to a suitable formation directly (i.e., without introducing the methane to the surface). According to one or more embodiments, the methane rich retentate is processed at the surface and may be injected and carried by an additional injection line from the surface to a storage zone for storage.

In step 625 of workflow 300, the retentate is stored in the storage zone in periods of low demand. Conversely, the retentate is recovered from the storage zone when the demand is high 630. During periods of high demand, a line may be used to recover the retentate from the storage zone and carry it from the storage zone to the gas plant located at the surface.

Embodiments of the present disclosure may provide at least one of the following advantages. The downhole membrane system to control natural gas production enables the production facility to produce valuable NGL continuously, while storing the associated natural gas downhole in a formation suitable as a storage zone. The natural gas can be recovered from the storage zone and refined at a gas plant when needed to meet demand. The proposed concept can be used to modify existing production facilities or for new projects. This invention eliminates the high cost of natural gas storage facilities built above ground.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed:

1. A method for controlling production of natural gas from a formation below a surface, the method comprising:
 installing a membrane module, comprising a membrane, downhole, wherein the membrane selectively permeates NGL over methane;
 separating high pressure natural gas feed with the membrane module into an NGL rich permeate and a methane rich retentate;
 carrying the permeate through a first line from the membrane module to a gas plant located above the surface;
 carrying the retentate from the membrane module through a second line for injection into a storage zone below the surface without introducing the retentate to the surface;
 storing the retentate in the storage zone; and
 recovering the retentate from the storage zone through a third line.

2. The method of claim 1, wherein contaminants are removed from the permeate in the gas plant to manufacture an NGL product stream.

3. The method of claim 1, wherein contaminants are removed from the recovered retentate in the gas plant.

4. The method of claim 1, further comprising recovering the retentate through from the storage zone through a third line to the gas plant; wherein contaminants are removed, producing a natural gas product.

5. A system for controlling production of natural gas, comprising:
 a membrane module installed downhole within a casing of a wellbore in a production reservoir, the membrane module configured for receiving a feed comprising a high-pressure natural gas from the production reservoir, and separating the high pressure natural gas into a permeate rich in NGL and a retentate rich in methane;
 a gas plant located at a surface;
 a first line within the casing for carrying the permeate from the membrane module to the gas plant;
 a storage zone located below the surface;
 a second line within the casing for carrying the retentate from the membrane module to the storage zone without introducing the retentate to the surface; and

a production line within the casing for recovering methane rich gas from the storage zone to the gas plant.

6. The system of claim 5, wherein the membrane module incases a membrane made of a material selected from the group composed of Poly(dimethylsiloxane) (PDMS), Poly (1-trimethylsilyl-1-propyne) (PTMSP), poly(octyl-methyl-siloxane) (POMS) and combinations thereof.

7. The system of claim 5, wherein the membrane module is fabricated from stainless steel.

8. The system of claim 5, wherein the gas plant is configured for refining the permeate through the first line to produce an NGL product from the permeate.

9. The system of claim 5, comprising:

at least one seal installed between the membrane module and a casing for preventing a natural gas from bypassing the membrane module and maintaining high pressure in the feed.

10. The system of claim 5, wherein the gas plant is configured for refining methane rich gas received through the production line to produce a natural gas product from the storage zone.

11. The system of claim 10, wherein the gas plant further comprises:

a system configured for removing contaminants from the permeate to manufacture NGL products.

\*    \*    \*    \*    \*